W. H. Birdsell.
Boat Detaching.
Nº 2,409.
33,413.
Patented Oct. 1, 1861.
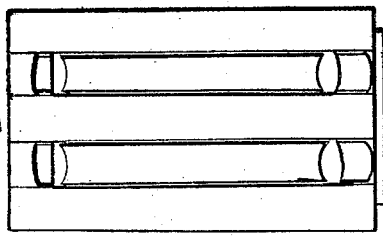
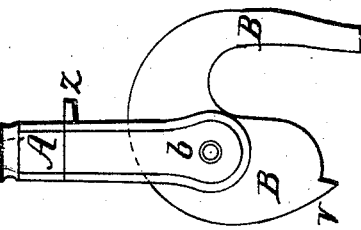
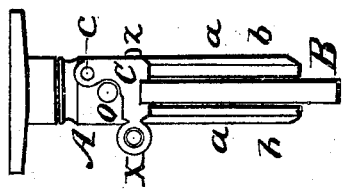
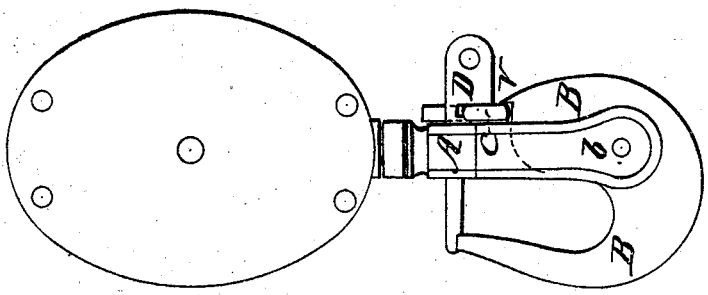
Witnesses.
Daniel Leary
W. J. Magee.
Inventor.
Wm. H. Birdsell.

UNITED STATES PATENT OFFICE.

WILLIAM H. BIRDSELL, OF ELIZABETHPORT, NEW JERSEY, ASSIGNOR TO HIMSELF AND ELI KELLAM, OF SAME PLACE.

IMPROVED TACKLE-BLOCK HOOK.

Specification forming part of Letters Patent No. 33,413, dated October 1, 1861.

*To all whom it may concern:*

Be it known that I, WILLIAM H. BIRDSELL, of Elizabethport, in the county of Union and State of New Jersey, have invented a new and Improved Tackle-Block Hook; and I do hereby declare that the following is a full, clear, and exact description of the construction and operation of the same, reference being had to the annexed drawings, making part of this specification, of which—

Figure I is a side view of the hook, (which in this figure and in Fig. V is depicted for the purpose of better describing its operations as attached to a block by an ordinary swivel.) In this figure the ratchet hereinafter described is in place. The mousing-pin hereinafter described is also in place, but not secured by a turn, as hereinafter described. In this position if the mousing-pin is secured by a turn, as hereinafter described, the hook is perfectly moused, so as to prevent anything slipping the hook, with a mousing that can be removed or restored at pleasure. Fig. II is a view of the hook turned on the swivel, so as to present the shank of the hook. The hook is in position and the ratchet is in its place, but the mousing-pin is out. In this position the hook is ready to be used to detach or relieve itself from a boat, weight, &c., as is hereinafter described. Fig. III is the mousing or mousing-pin. Fig. IV is the ratchet. Fig. V is a side view of the hook as detached and relieving itself from a boat, weight, &c. The mousing-pin is out and the ratchet is not shown in this figure, in order to exhibit the point projecting from the shank against which the ratchet is made to fall, as hereinafter described.

The hook is made in two parts, which for distinction I call the "shank" of the hook and the "movable part" of the hook.

The shank of the hook is stationary, except that it revolves on the swivel as ordinary swivel-hooks. A side view of the shank is shown in Figs. I and V, and a back view in Fig. II. In each figure it is designated by letter A. The shank is divided at its lower end into two parts or legs. These are shown in Fig. II, where they are designated by letters *a a*, and their position, comparative size, and distance apart shown. They are of such distance apart and of such length that the movable part of the hook may, as hereinafter described, readily pass between them moving forward. Attached permanently to the shank is a projection (designated in Figs. II and V as *z*) against which the ratchet falls and by which it is kept in the position shown in Fig. II and prevented falling farther backward or downward.

The movable part of the hook is designated in Figs. I, II, and V by letter B. It is of the irregular shape represented in Figs. I and V, and has a tooth or flange, (designated by letter *v*.) This part of the hook is fastened to the shank by the pin or rivet, which passes through both legs of the shank at the point therein designated by letter *b* on Figs. I, II, and V, upon which pin the movable part of the hook plays freely between the legs of the shank, as shown in Fig. II. When in position the tooth or flange *v* is caught and held by the ratchet, as is represented in Figs. I and II. When the ratchet is raised, the tooth escapes and the movable part of the hook falls forward until its point is presented vertically downward, as is represented in Fig. V. The movable part of the hook cannot move backward, as the point of the hook will strike the shank above the place where it divides into two legs.

The ratchet is of the shape shown in Fig. IV and is designated by letter C in Figs. I, II, and IV. It is attached to the shank by a pin or rivet at *c*, as shown in Fig. II, around which it plays loosely, so that it falls by its own weight against the projection *z*, by which it is kept in place, so as to catch the tooth *v* of the movable part of the hook. At *x* is a ring or hole, to which is fastened a rope, small line, or chain, the use of which will be described in the description of the operation of the hook. The ratchet is beveled on the side next the shank, so that the circular sweep of the movable part of the hook when brought back from its position shown in Fig. V will of itself raise the ratchet until it passes the tooth, when it will fall by its own weight and secure the hook. When the ratchet is in that position, the mousing-pin may be inserted in the hole marked *o* in Fig. II, which prevents the ratchet from being lifted. The ratchet is cut out on the side next the shank, so as to receive behind it the key or ward of the mousing-pin and secure it from slipping out, as hereinafter described.

The mousing-pin is designated on Figs. I and III by letter D. It is made of the comparative size and of the shape therein represented. It is made to pass through the hole *o* in the shank when the ratchet is in position, thereby securing the ratchet from being raised. On the mousing-pin there is a projection or ward (designated by letter *d*) by which the pin is secured in place as follows: A bolt with a head on each end is inserted through the hole in the head of the mousing-pin, (designated as *d*,) so as to slide freely therein. When the mousing-pin is inserted in *o*, it must be placed in such position that ward *d* passes above the ratchet. When ward *d* reaches the shank, pin D must be turned downward a half-turn, by which ward *d* passes behind the ratchet and between it and the shank in the cut made in the ratchet, as before described. When the half-turn is completed, the bolt will fall through hole *d* to the head and will by its weight retain the mousing-pin in that position. So long as ward *d* remains behind the ratchet the mousing-pin cannot work out and the hook is secure. To withdraw pin D it must be turned so that ward *d* escapes from behind the ratchet. The end of the mousing-pin, after passing through hole *o*, projects beyond the shank and is received in the point of the hook, as shown in Fig. I, and thus closes or mouses the hook securely.

The operations for which this hook can be used are various. It can be used for all cases where an ordinary hook can be used with the manifest improvement and advantage of a secure mousing of a permanent nature which may be attached or detached at pleasure; but the chief advantage and improvement will be in the operations which I now proceed to describe.

Let it be designed to relieve from the hooks a boat lowered from the davits of a ship at the instant it touches the water or any weight from the hook at a given and specified distance from the point whence it is lowered or other similar purpose. Fastened to the ring or hole of the ratchet (marked *x*) is a small line, chain, or rope, the other end of which is fastened to the outboard end of the davits or to the point whence the weight is lowered or any fixed point in the line or nearly in the line of the direction of lowering the boat, weight, &c. The length of this line, chain, or rope is to be graduated according to the distance the boat, weight, &c., is to be lowered, so that the line, rope, or chain will haul taut on the ratchet just before the boat reaches the water or the weight reaches the place where it is to be deposited. When the line, rope, or chain is hauled taut, it raises the ratchet from before the tooth of the movable part of the hook, and the weight of the boat, load, &c., carries forward the movable part of the hook until its point is turned vertically downward, as shown in Fig. V, and the boat, weight, &c., is freed in an instant from the hook. In this case the mousing-pin is not used.

A manifest advantage and improvement is also gained by the use of this hook aloft—as, for example, in fastening a standing-block to any part of the rigging aloft. With an ordinary hook attached to a block strapped with iron and carrying from four to six ropes, often of large size, it is a difficult operation, as the whole block not only has to be raised as high as the ring into which the hook is to be placed, but the block has to be canted on one side, so that the point of the hook may enter the ring. With this hook the same operation may be performed with ease as follows: Remove the mousing-pin, lift the ratchet, and place the movable part of the hook in the same position as in Fig. V. Then raise the block just sufficiently to turn the movable part of the hook so that the point thereof will enter the ring, &c. Then bring the movable part of the hook around until the ratchet may be slipped before the tooth and the mousing-pin inserted in the hole *o* and a half-turn given to it, as is above described, and the hook will then be secured and moused.

I claim as my invention and desire to secure by Letters Patent—

1. The tripping-ratchet C, in combination with the hook B, substantially in the manner described, for the purpose specified.

2. The mousing-pin D, in combination with the tripping-ratchet C and the hook B, substantially in the manner described, for the purpose specified.

WM. H. BIRDSELL.

Witnesses:
DANIEL LEARY,
W. J. MAGIE.